United States Patent
Habermas et al.

(10) Patent No.: US 7,925,255 B2
(45) Date of Patent: Apr. 12, 2011

(54) SATELLITE RADIO FILE BROADCAST METHOD

(75) Inventors: Stephen Habermas, Beverly Hills, MI (US); Walter A. Dorfstatter, Northville, MI (US); Dwayne Crocker, Lake Orion, MI (US)

(73) Assignee: General Motors LLC, Detroit, MI (US)

( * ) Notice: Subject to any disclaimer, the term of this patent is extended or adjusted under 35 U.S.C. 154(b) by 905 days.

(21) Appl. No.: 11/610,926

(22) Filed: Dec. 14, 2006

(65) Prior Publication Data

US 2008/0146219 A1 Jun. 19, 2008

(51) Int. Cl.
*H04W 40/00* (2009.01)

(52) U.S. Cl. ............... 455/428; 455/186.1; 455/550; 455/419; 455/3.01; 455/3.04; 375/316

(58) Field of Classification Search .................. 455/428
See application file for complete search history.

(56) References Cited

U.S. PATENT DOCUMENTS

| | | | |
|---|---|---|---|
| 5,406,626 A | 4/1995 | Ryan | |
| 5,809,472 A | 9/1998 | Morrison | |
| 5,956,629 A * | 9/1999 | Morrison | 455/166.2 |
| 6,409,432 B1 | 6/2002 | Beck, III | |
| 7,076,202 B1 * | 7/2006 | Billmaier | 455/3.04 |
| 7,231,270 B2 * | 6/2007 | Kamdar et al. | 700/94 |
| 7,346,320 B2 * | 3/2008 | Chumbley et al. | 455/186.1 |
| 7,542,757 B2 * | 6/2009 | Fishman et al. | 455/419 |
| 2002/0065064 A1 * | 5/2002 | Griffith et al. | 455/405 |
| 2003/0158614 A1 * | 8/2003 | Friel et al. | 700/94 |
| 2003/0160734 A1 * | 8/2003 | Rogers | 345/2.1 |
| 2005/0222764 A1 | 10/2005 | Uyeki et al. | |
| 2006/0046649 A1 * | 3/2006 | Videtich | 455/12.1 |
| 2007/0050409 A1 * | 3/2007 | Bugir et al. | 707/104.1 |
| 2007/0093943 A1 * | 4/2007 | Nelson et al. | 701/2 |
| 2007/0118617 A1 * | 5/2007 | Lee et al. | 709/219 |

\* cited by examiner

*Primary Examiner* — Marivelisse Santiago-Cordero
*Assistant Examiner* — Issam Chakour
(74) *Attorney, Agent, or Firm* — Anthony L. Simon; Reising Ethington P.C.

(57) ABSTRACT

A method and system for distributing files to remote receiving units such as passenger vehicles. The method includes the steps of (a) creating a file broadcast schedule that identifies a plurality of files and that includes scheduling information indicating when the files will be transmitted, (b) sending the file broadcast schedule to a number of remote receiving units via wireless transmission, (c) analyzing the file broadcast schedule at one or more of the remote receiving units by identifying at least one specific file intended for receipt and storage at that receiving unit and by determining from the scheduling information a scheduled time at which the specific file is intended to be received, (d) monitoring a digital satellite transmission channel at the scheduled time for the specific file, and (e) upon receiving the specific file, storing it at the remote receiving unit.

5 Claims, 9 Drawing Sheets

```
<Header>File Broadcast Schedule
    <ScheduleDate>September 27, 2006</ScheduleDate>
    <ScheduleTime>05:45 GMT</ScheduleTime>
</Header>

<FileEntry>File1
    <STIDRange>0792-1251</STIDRange>
    <Priority>Normal</Priority>
    <BroadcastTime>13:28 GMT</BroadcastTime>
    <BroadcastInterval>00:06:15</BroadcastInterval>
    <Expiration>October 30, 2006</Expiration>
    <FileID>00072964</FileID>
    <MIMEType>application</MIMEType>
    <FileSize>29560</FileSize>
    <FileName>serialapi.java</FileName>
    <Comp>True</Comp>
    <ConfReq>True</ConfReq>
</File>

<FileEntry>File2
    ...
</File>

<FileEntry>FileN
    ...
</File>
```

*Figure 4*

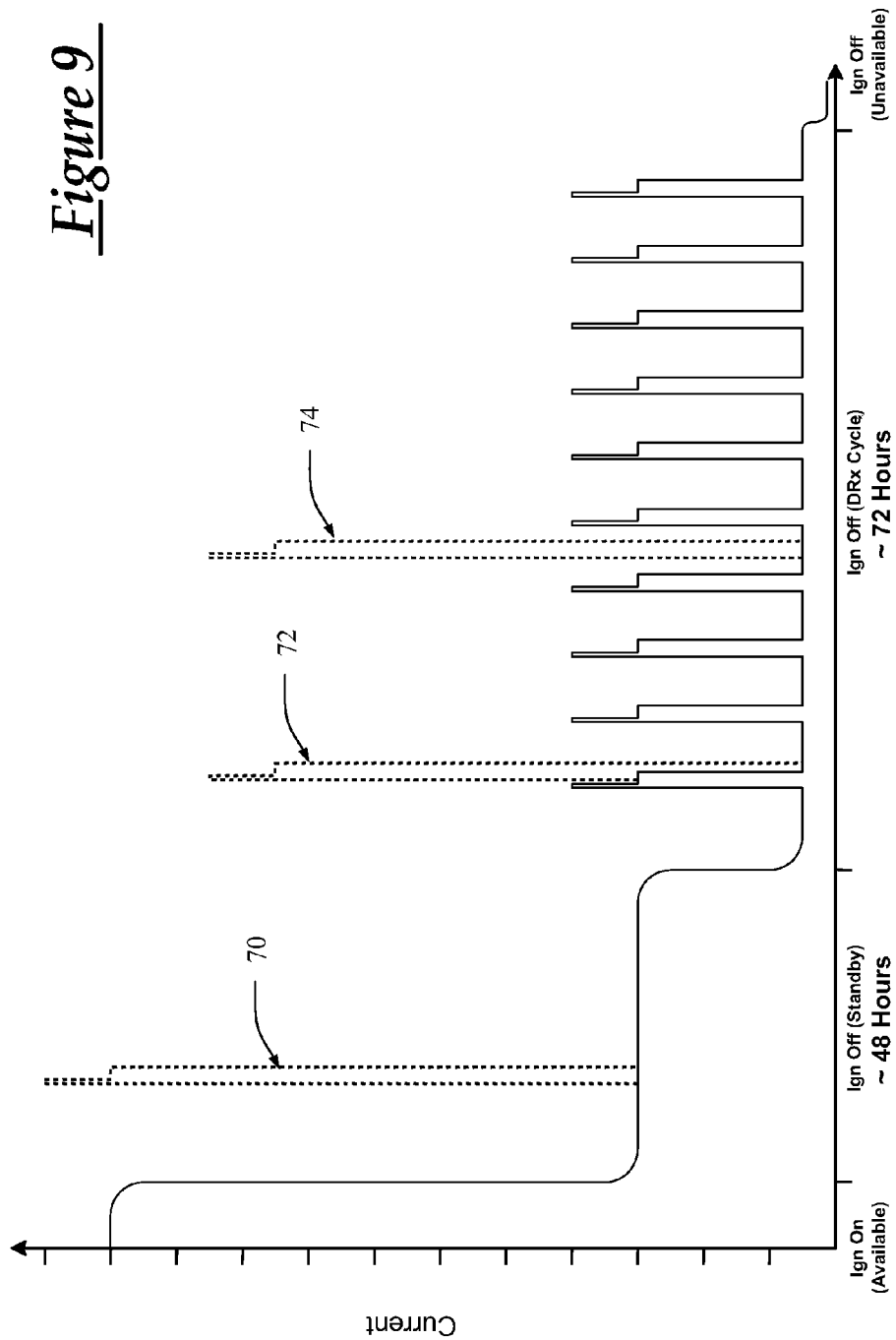

SATELLITE RADIO FILE BROADCAST METHOD

TECHNICAL FIELD

This invention relates to the use of satellite and other wireless transmission equipment to distribute files containing software or other content to remote receivers such as vehicles.

BACKGROUND OF THE INVENTION

Satellite radio (SR) has become a popular means of distributing programming content (news, music, etc.) to customers having either a land-based (fixed) receiver or a mobile receiver such as are now commonly installed in automobiles. XM™ radio is one such example satellite radio service. SR broadcasting has also been used for software distribution in which executable software files are included in the satellite broadcast stream and then received and installed at remotely located satellite receivers. Apart from distributing software and programming content, it is known to include in the satellite radio stream a broadcast schedule sent over one or more dedicated or shared satellite broadcast channels which can then be used by the SR receivers to, for example, identify the software being subsequently broadcasted or provide a visual display of information relating to the content (e.g., the title of a musical piece or news program). Furthermore, at least for cable and/or satellite television broadcasts, the program schedule can also be used to schedule in advance a recording of a program that may play at a later time when the receiver is unattended.

SUMMARY OF THE INVENTION

In accordance with one aspect of the invention, there is provided a method of distributing files to remote receiving units. The method includes the steps of:

creating a file broadcast schedule that identifies a plurality of files and that includes scheduling information indicating when the files will be transmitted;

sending the file broadcast schedule to a number of remote receiving units via wireless transmission;

analyzing the file broadcast schedule at one or more of the remote receiving units by identifying at least one specific file intended for receipt and storage at that receiving unit and by determining from the scheduling information a scheduled time at which the specific file is intended to be received;

monitoring at least one digital satellite transmission channel at the scheduled time for the specific file; and upon receiving the specific file, storing it at the remote receiving unit.

Preferably, the file broadcast schedule can be transmitted via digital satellite transmission in advance of the specific file. The remote receiving units can be vehicles equipped with a telematics unit capable of communicating with a central facility over a wireless telecommunications system such as a cellular network. This allows successful receipt of the specific file to be acknowledged back to central facility using the wireless telecommunications system. It also enables the transmission of the file broadcast schedule and even the specific file itself over the telecommunications system in the event these items are not successfully received via the satellite transmission.

BRIEF DESCRIPTION OF THE DRAWINGS

Preferred exemplary embodiments of the invention will hereinafter be described in conjunction with the appended drawings, wherein like designations denote like elements, and wherein:

FIG. 4 depicts an excerpt from an exemplary file broadcast schedule;

FIG. 9 is a graph of current draw versus time showing how processing of the file broadcast triggers are handled during different low power quiescent states.

DETAILED DESCRIPTION OF THE PREFERRED EMBODIMENTS

The system and method discussed below allows for the distribution of digital files containing software and other digital content to select vehicles or groups of vehicles using satellite radio broadcast of the files along with a file broadcast schedule that identifies which vehicle(s) are to receive the files and when. Upon receipt of the file broadcast schedule, each vehicle analyzes the schedule to determine which, if any, of the files contained in the schedule are destined for it. The vehicle(s) then monitor the appropriate digital satellite transmission channel at the scheduled time and, upon receipt of the file, stores it at the vehicle. The stored file can then be processed and/or distributed within the vehicle for such purposes as providing software patches, new software driver installation, music and other audio content, video, etc. In this way, digital content can be widely distributed using existing satellite radio transmission facilities and equipment, while restricting the distribution to particular vehicles or groups of vehicles.

Figure 1:
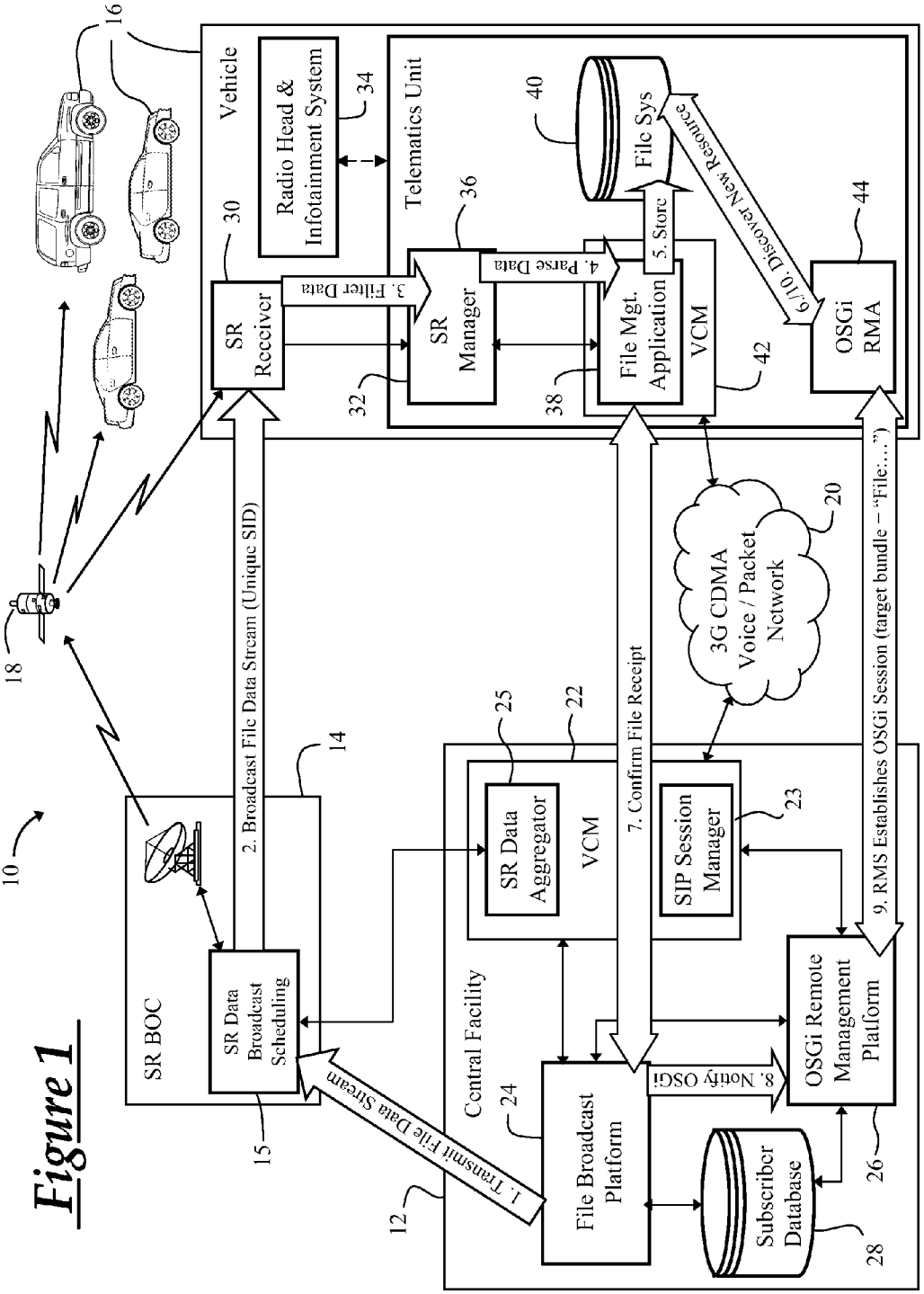
FIG. 1 is a block diagram of a file distribution system constructed in accordance with the invention and showing some of the process flow during a typical file distribution and installation at a vehicle.

Referring to FIG. 1, there is shown an overview of an exemplary system 10 which in general includes a central facility 12, satellite radio transmission facility 14, and a plurality of vehicles 16, one of which is shown in block diagram form with its relevant internal hardware and software modules. Communication between the central facility 12 and vehicle 16 is either one-way via the SR facility 14 and one or more satellites 18 or two-way via a wireless cellular communication system such as shown generally at 20. The central facility 12 is a back end office that includes the equipment needed to prepare the files for distribution, the communication equipment to interface with the SR facility 14 and communicate with the vehicles via cellular network 20, as well as the information needed to properly manage the distribution of the broadcasted software to particular vehicles. For these purposes, the central facility 12 includes a vehicle communication module (VCM) 22, file broadcast platform module 24, OSGi remote management platform module 26, and a subscriber database 28 containing vehicle records. The central facility can be incorporated into a call center that provides other services via cellular network 20 using subscriber database 28 and VCM 22, or can be a standalone, dedicated facility. VCM 22 handles communication with the vehicles over the cellular network using, for example, CMDA modems at each end. VCM 22 includes both an session initiation protocol (SIP) session manager 23 and an SR data aggregator 25. The SIP session manager 23 is an application-layer software process used to setup data communication sessions with the vehicle which, as indicated in FIG. 1, includes its own VCM 42 that also includes the necessary software to initiate data communications via cellular network 20. The data aggregator 25 interfaces between the central facility 12 and SR facility 14 over a data connection such as a dedicated Ti line using DCCP transport protocol, and communications can be encrypted using, for example, SSL. Particular implementations of the modules and equipment contained within the central facility 12 will be known to those skilled in the art.

The SR facility 14 is a satellite radio broadcast operations center (BOC) having a SR data broadcast scheduling module 15 that receives a file data stream from the central facility and incorporates it into broadcasts sent from the SR facility 14 to the vehicles 16 via satellite 18. Suitable, existing satellite radio facilities are known; for example, that used to deliver XM™ radio programming.

In this system 10, the vehicles 16 comprise remote receiving units that are each configured to receive the satellite radio broadcast and extract from it the proper files destined for that receiving unit. Each vehicle 16 has a vehicle electronics system that, apart from other standard components and systems (e.g., ignition system, engine control unit, SIR safety system, climate control, etc.), includes a satellite radio receiver 30, a telematics unit 32, and a radio head and infotainment system 34. The SR receiver 30 can be a conventional component that receives radio broadcast streams from the satellite 18 for playback of programming content to the vehicle occupants via the infotainment system 34. This playback can be by way of the telematics unit 32 which, as will be discussed below, examines the incoming broadcast stream for the file broadcast schedule and associated files so that they can be pulled from the satellite broadcast. Alternatively, regular programming content can be supplied directly from the SR receiver 30 to the infotainment system 34 over an entertainment system bus (not shown) as is known to those skilled in the art. This infotainment system can be implemented in various ways known to those skilled in the art, and can include such things as a vehicle radio system, video screen display for passenger occupants, and the like.

The telematics unit 32 is a microprocessor-based unit that includes the hardware and software needed for audio and data communication via the cellular network 20, as well as for communication with other vehicle system modules (not shown) so that data and software can be transmitted between those vehicle system modules and the central facility 12 using the telematics unit. The particular hardware and software components of telematics unit 32 used for these purposes are known to those skilled in the art and are therefore not shown in FIG. 1. However, those components of telematics unit 32 specific to implementation of the disclosed embodiment of the invention are depicted, and they include an SR manager 36, file management application (FMA) 38, file system storage 40, and an OSGi remote management application (RMA) 44. SR manager 36 receives filtered SR broadcast stream data from the SR receiver 30 and is used to pull from that filtered data a file broadcast schedule (FBS) and the particular file(s) that have been identified from the FBS as applicable to that vehicle. This can be done using a parser application that parses the received data and pulls from it the FBS and applicable file(s). Alternatively, this parser application can be implemented as a part of the file management application 38. As shown, the FMA 38 can be implemented as a part of a vehicle communications module 42 which handles communications with the central facility 12 via the cellular network 20. Alternatively, the file management application 38 can be a separate process that interfaces with VCM 42.

File management application 38 in general controls the file download and storage process at the vehicle 16. It receives the file broadcast schedule (FBS) and determines what files(s) are to be received for that particular vehicle and when. Then, upon obtaining the desired file following parsing of the filtered data from the SR receiver 30, it stores the file in a staging area using file system storage 40, and then acknowledges back to the central facility 12 that the file has been received. Once the file has been stored, the OSGi RMA 44 can then carry out installation of the file (software install on a vehicle system module, adding music to library, etc.). The process of receiving, extracting, and installing the files will be described in greater detail further below following a detailed explanation of the SR broadcast stream content and organization.

As will be appreciated by those skilled in the art, the OSGi remote management platform 26 and OSGi remote management application 44 are both part of an OSGi remote management system that is used to handle the management and installation of files at the vehicle once they have been received and stored. The OSGi is a java-based service platform that can be remotely managed so that physical access to the vehicle is not needed for installation of the files received via the SR broadcast. The implementation and use of OSGi for the system of FIG. 1 will be apparent to those skilled in the art. Although shown as a part of the telematics unit 32, it will be appreciated that OSGi RMA 44 and/or one or more of the other components 36-40 can be implemented outside of the telematics unit 32 using direct wired or network bus communication between the component(s) and telematics unit. Also, SR receiver 30 can be installed in the vehicle as a separate standalone unit that communicates with telematics unit 32 over, for example, a serial peripheral interface (SPI) connection, or alternatively can be integrated in with the telematics unit as a single, combined assembly.

Figure 2:
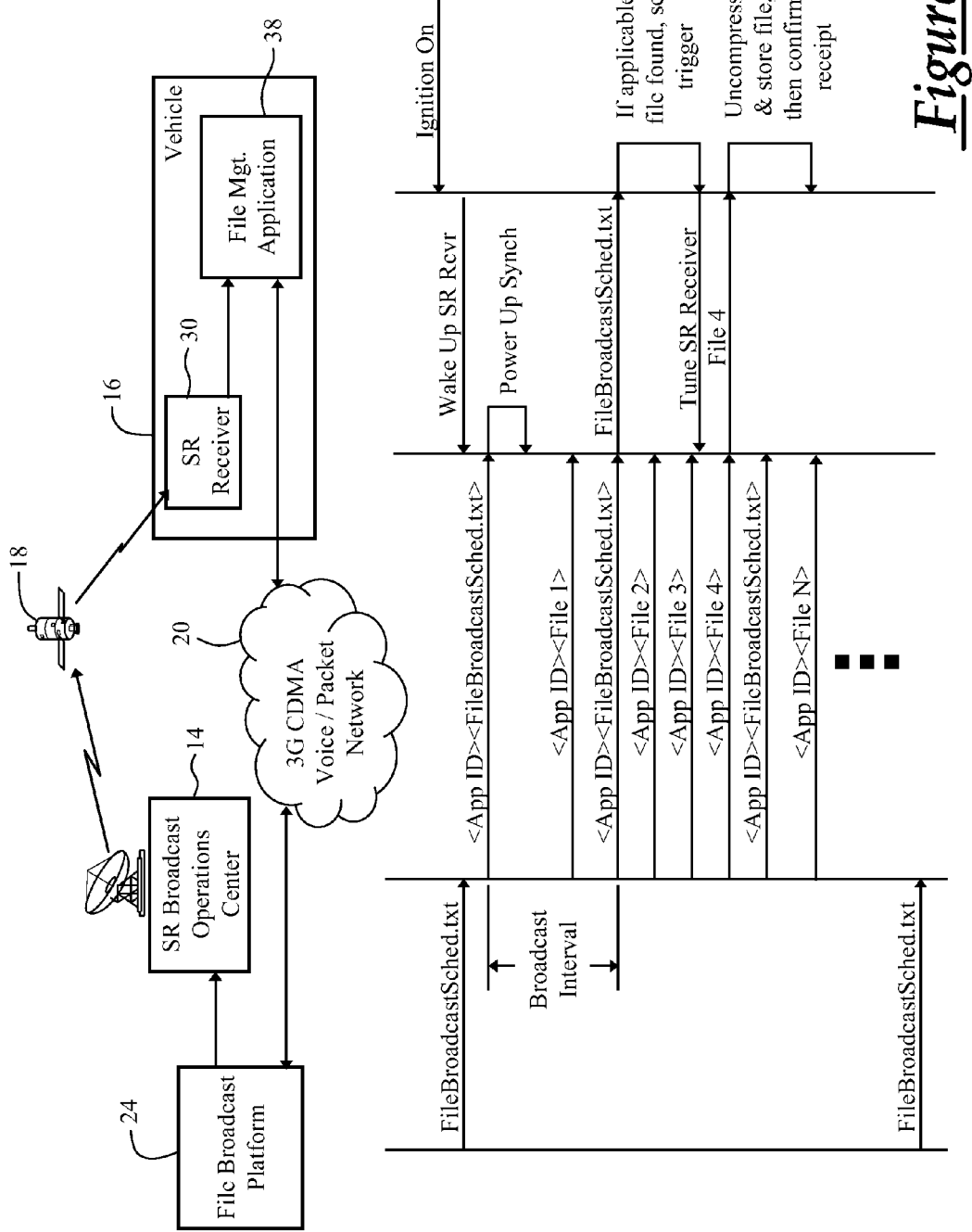
FIG. 2 depicts the sequencing of events between different components of the system of FIG. 1 during a typical file broadcast schedule and file download to the vehicle.

Referring now to FIG. 2, there is shown the sequence of events involved in a transmission of the file broadcast schedule (FBS), files, and associated overhead. Prior to the sequence of events shown in FIG. 2, a collection of the needed files will be transmitted from the file broadcast platform 24 to the SR BOC 14 via the SR data aggregator 25. These are stored at the SR BOC 14 for incorporation into the SR broadcast stream on one or more transmission channels. Then, as shown in FIG. 2, initially an updated FBS is provided by the file broadcast platform 24 to the SR BOC 14. For each broadcast interval (e.g., one to five minute intervals), this FBS is transmitted along with one or more of the files to the satellite 18 for retransmission to the vehicles 16. Different numbers of files can be transmitted following each FBS during a particular broadcast interval depending upon their size. Thus, for example, only a single file might be transmitted during one broadcast interval (e.g., File 1), or a number of files might be transmitted during the interval (e.g., Files 2-4). In either event, the FBS is periodically transmitted and is interleaved between different specific files in the broadcast stream. The process of transmitting the FBS and files during consecutive broadcast intervals repeats until all files have been transmitted at least once and until a new FBS and possibly one or more new files are received at the SR BOC 14 from the central facility 12.

At the vehicle side, processing starts upon vehicle ignition which results in a wakeup signal being sent to the SR receiver

30. This wakeup signal is used for satellite radio receivers such as SR receiver 30 that operate in both an active mode, in which the receiver processes the digital satellite transmissions sent by the satellite 18, and a sleep mode, in which the receiver is at least in part powered, but is not processing the incoming broadcast stream. The wakeup signal causes SR receiver 30 to switch from the sleep mode to the active mode and begin processing the incoming broadcast stream. Upon receiving the first FBS following wakeup, a power up synch is generated at the SR receiver which allows it to synch to the incoming SR broadcast. The FBS received at the following broadcast interval is then passed to the file management application (FMA) 38 which examines the FBS to determine if there are any files listed in the FBS that are applicable to that particular vehicle. Applicable files can be determined using an identifier unique to that vehicle or to a group of vehicles (e.g., based on manufacturer's model and engine type). If so, a trigger is set which is used to tune the SR receiver 30 to the proper transmission channel at the appropriate time. The setting and use of triggers in vehicle telematics units is known to those skilled in the art. Once the trigger occurs, the SR parser application in the SR manager 36 monitors the incoming data from the SR receiver for the applicable file (e.g., File 4). Once that file is located, it is provided to the FMA 38 which decompresses it (if necessary) and stores it in the file system storage 40. Thereafter, successful receipt of the file is confirmed back to the central facility 12 using the cellular network 20. OSGi RMA 44 can be designed to monitor for new resources (files) and carry out installation once they are found; alternatively, FMA 38 can notify OSGi RMA 44 of the new file when confirming receipt back to the central facility 12.

Figure 3:
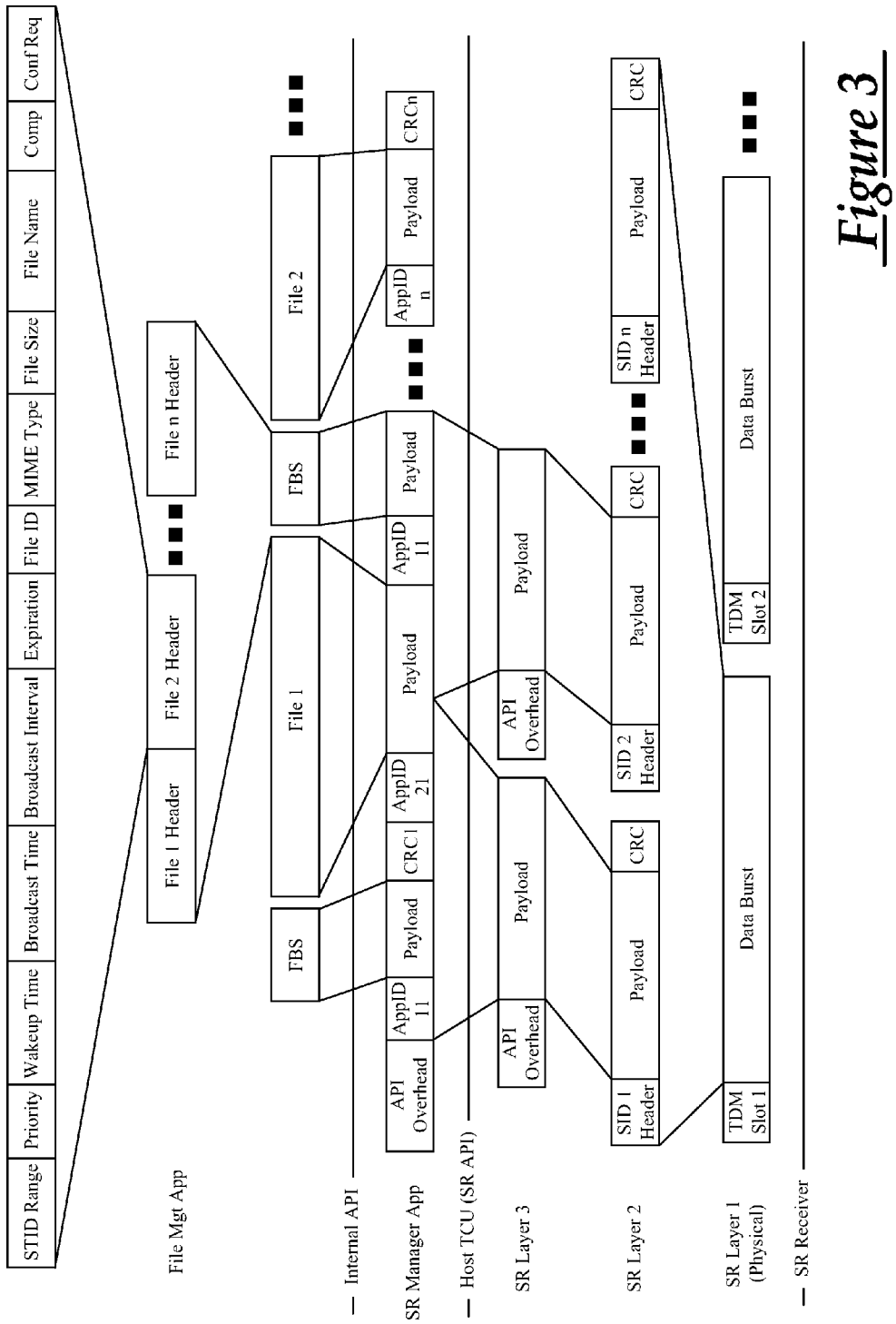
FIG. 3 shows the protocol used for encapsulating the file broadcast schedule and files into the satellite broadcast stream.

FIG. 3 depicts the content and organization of the broadcast data stream showing the encapsulation protocol used at various levels. At the outer physical layer (SR Layer 1), data is transmitted using TDM which is well known in the art. Within each TDM slot data burst are additional SR layers that comprise a stream of payloads and API overhead including a Service ID (SID) header prefix and a CRC checksum for error detection. At the level utilized by the SR manager 36, the SR transmission payload includes application IDs (AppID) that identify the file broadcast schedule (FBS) and files themselves. This payload data can also be appended with CRC checksums to detect transmission errors. The file management application (FMA) 38 accesses the FBS and pulls from it the information necessary to determine whether any of the files listed in the FBS are destined for that vehicle. For that purpose, the FBS comprises a series of file headers (one per file), each of which includes a collection of data items relating to either the file or the vehicle. Those data items are as follows:

STID Range: Identifies the telematics unit (and thus, the vehicle) by Station ID range so that the file is processed by only the desired vehicles.

Priority: Identifies the priority of the file to be broadcast (Low, Normal, or High). For example, certain calibration files may have a higher priority than a software bundle, or vice versa).

Wakeup Time: The absolute time (based GPS/UTC time) that the FMA will power on the SR receiver (if powered off) and prepare to receive the file at the Broadcast Time.

Broadcast Time: The absolute time (based on GPS/UTC time) that the initial file broadcast will begin.

Broadcast Interval: The number of seconds between subsequent broadcasts of the file, starting from the absolute Broadcast Time.

Expiration: The date upon which the FMA should abort any further attempts to retrieve the file.

File ID: Unique identifier for the file. Used by the FMA to ensure a file is only received and saved once.

MIME Type: The file type/format to be broadcast. For example, application, audio, image, message, text, or video.

File Size: The size of the file (in Kbytes).

File Name: The actual name of the file to be broadcast with 3 character file extension.

Compression (Comp): Indicates whether or not the file is compressed.

Confirmation Request (Conf Req): Identifies whether or not a confirmation of file receipt is required via a packet data connection over the cellular network.

The FBS is broadcasted as an ASCII text file and can be implemented using a markup language such as XML. FIG. 4 depicts a sample excerpt from an FBS text file using pseudo-XML tags. In this example, the FBS includes not only the file entry headers, but also an its own header that specifies the scheduled transmission date and time of the FBS. Also note that no Wakeup Time is included in this example, in which case the wakeup time could be determined by the FMA based on the specified Broadcast Time.

Although the illustrated embodiment uses the vehicle STID to uniquely identify the vehicle for which a file is to be received and installed, other unique vehicle identifiers could be used. For example, the VIN number can be used which would allow groups of like vehicles to be specified so that a particular software or calibration update could be received and processed only by those vehicle having a particular make, model, and engine type. Alternatively, the unique ESN/MIN pair assigned to the telematics unit could be used, or the SR receiver serial number or other identification number. Other such means of uniquely identifying vehicles and/or groups of vehicles can be used.

Figure 5:
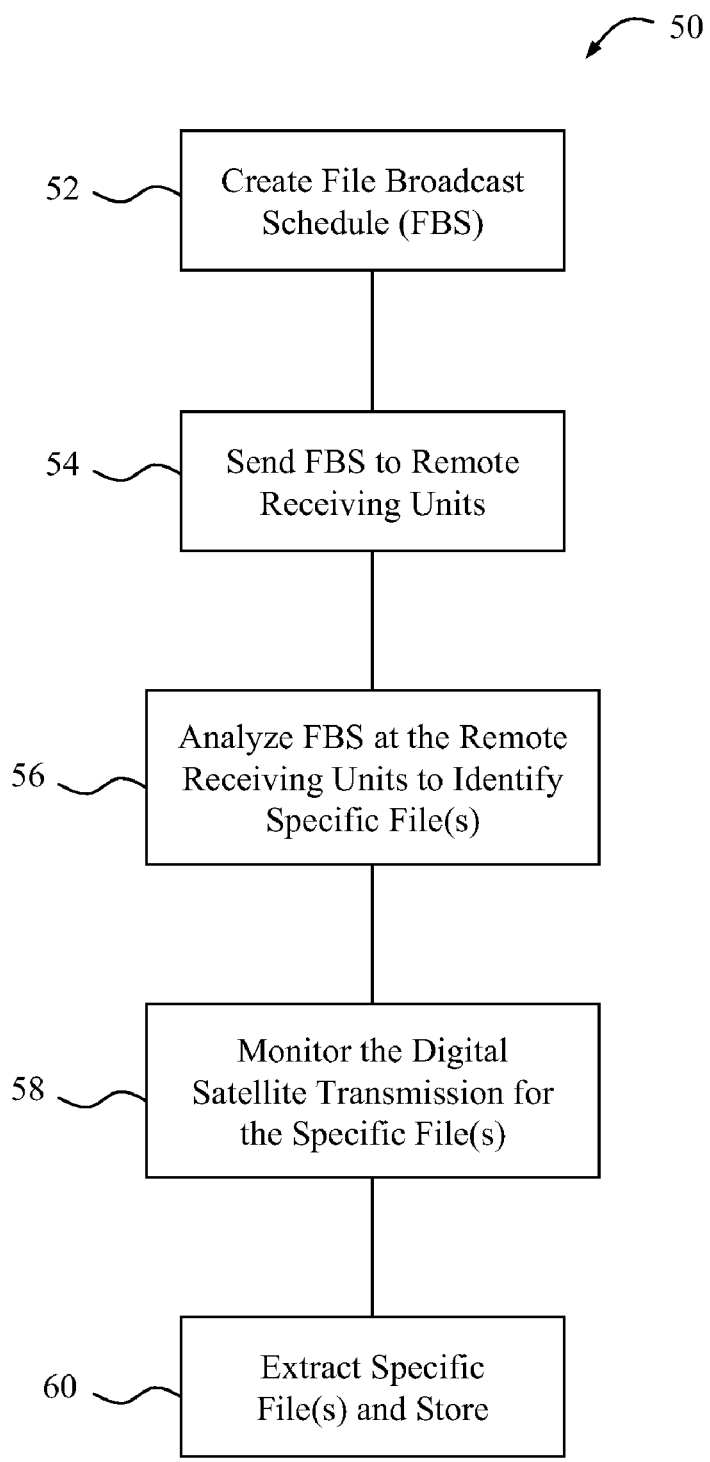
FIG. 5 shows the overall process for distributing files using the system of FIG. 1.

Having now described the system of the illustrated embodiment, the overall method used to distribute files will now be discussed. As shown in FIG. 5, the method 50 includes creating an FBS at step 52, sending the FBS (step 54) to a number of remote receiving units such as the vehicles 16, analyzing the FBS (step 56) at the remote receiving units, monitoring a digital satellite transmission channel for the specific file (step 58), and then, upon receiving the specific file, storing it (step 60). The FBS both identifies a plurality of files that are scheduled for transmission along with scheduling information indicating when the files will be transmitted. Referring back to FIGS. 3 and 4, the example FBS includes both of these pieces of information, as well as other useful data items. As discussed above, the FBS is sent in the digital satellite broadcast stream, but could also be sent wirelessly to the remote receiving units by other means. For example, it could be sent as a packetized data transmission using the cellular network 20 with the files themselves still be sent and received via satellite broadcast. This approach can be useful where one or more vehicles becomes out of sync and is no longer receiving the FBS via satellite transmission, in which case the FBS need only be sent by cellular connection to those vehicles for which it is applicable. Once received via the wireless network 20, the FBS can then be used to set one or more triggers in the FMA 38 to retrieve the proper file(s) when they are broadcasted via satellite. Analyzing of the FBS at step 56 is carried out by identifying at least one specific file intended for that remote receiving unit and by determining from the FBS's scheduling information a scheduled time at which the file is intended to be received. Then, when the appointed time comes, the appropriate digital satellite transmission channel(s) is monitored and the file stored once received. As discussed above, although not shown in the method of FIG. 5, receipt of the file can be subsequently confirmed back to the central office 12 and installation of the file at the remote receiving unit can be carried out as needed.

With reference back to FIG. 1, the process flow for carrying out one particular implementation of the file distribution method is shown by the numbered arrows. Initially, the file data stream (containing the created FBS and files) is provided from the file broadcast platform module 24 to the SR data broadcast scheduling module 15. Then, the file data stream is then incorporated into the SR broadcast stream and transmitted over a digital satellite transmission channel via satellite 18 to the SR receiver 30 at each vehicle 16. The FBS and files are broadcasted on an allocated SID of a specific TDM slot as shown in FIG. 3. Then, the SR receiver 30 filters the received data stream, only passing registered data (based on the SID) to the SR Manager 36. The SR parser application in SR manager 36 receives the filtered data stream and, from it, the FBS, parses it to pull the data from the tags and then sends that data via SPI to the FMA 38 where it is used to set any trigger needed for subsequent file retrieval from the incoming digital satellite broadcast stream. Received files are also passed through the to FMA 38 in this way. Then, the FMA 38 stores the received file in the file system storage 40. The OSGi RMA 44 thereafter discovers (or is informed of) the new file (e.g., binary resource) and is able to install or otherwise process it according to its MIME Type. If the Conf. Req. flag in the FBS file header is set to TRUE, then successful receipt of the file is confirmed back to the central office 12 by sending an acknowledgement message via packetized data transmission over the cellular network 20. This acknowledgement message can be sent using SOAP and, at the central facility, is used to generate a notification to the OSGi RMP 26 that the new file can be installed. OSGi RMP 26 then establishes and OSGi session, again via packetized data communication over the cellular network 20, to cause the OSGi RMA 44 to install the file as appropriate for its MIME Type. In carrying out these later steps, the confirmation sent back to the central facility 12 can include the location of the file such that the OSGi RMP 26 can reference the file location in the URL which allows the OSGi RMA 44 to pull the proper file from the file system storage 40.

Figure 6:
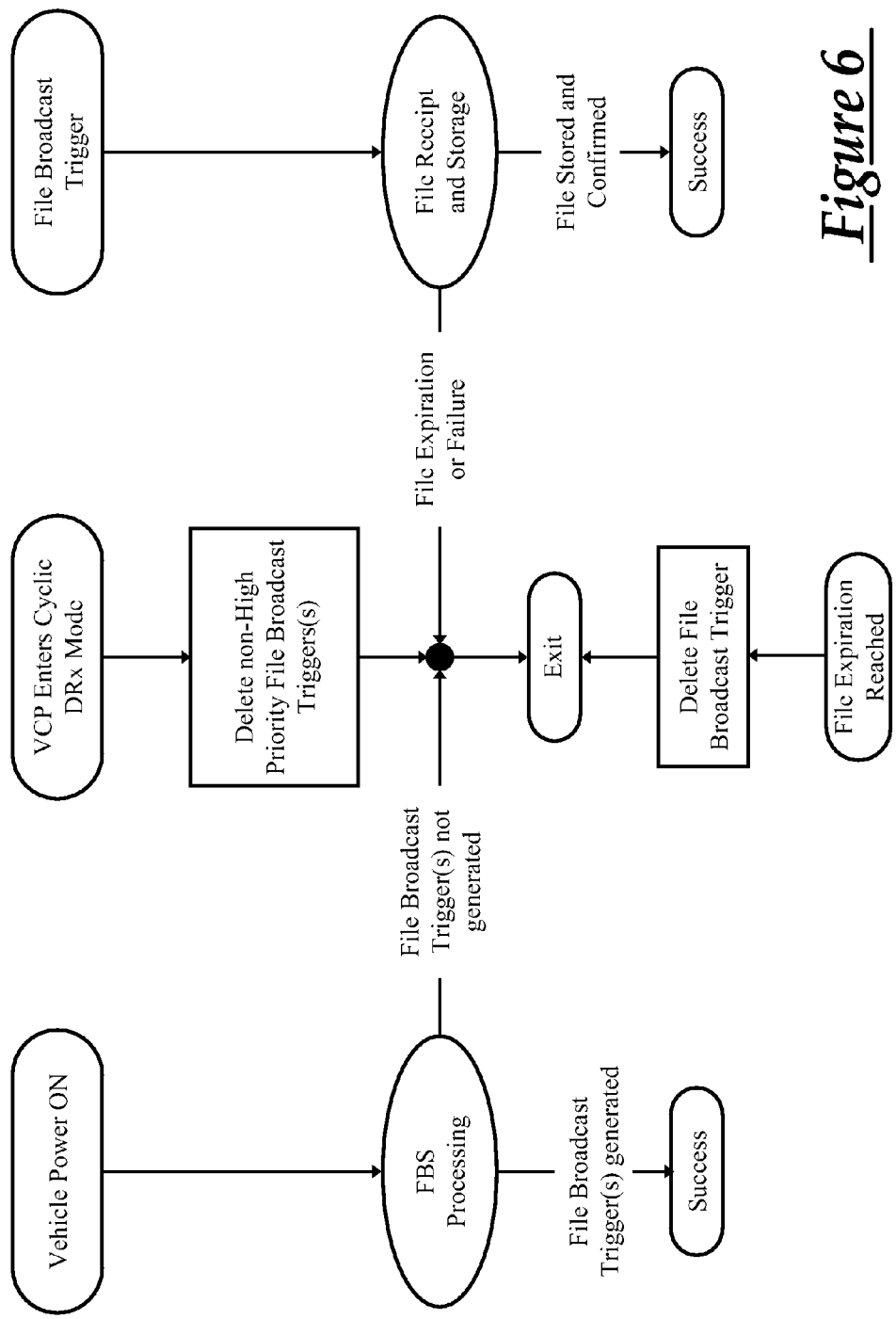
FIG. 6 is a flow chart of the various processes carried out by the file management application of FIG. 1.

FIG. 6 depicts the different processes carried out by the FMA 38 depending on vehicle state and events. Where the vehicle power is on, normal FBS processing is carried out as described above. If there are no files intended for the particular vehicle, then no triggers are generated and the process exits. If, however, there are files destined for the vehicle, one or more file broadcast triggers are generated. Where a particular file expiration date and time (as specified in the FBS file header for the file), and the file has not yet been successfully received, the existing broadcast trigger is deleted and the process exits. Also, where the vehicle ignition is not on, the vehicle will at some point enter a cyclic data receive (DRx) mode, in which case non-high priority file broadcast triggers will be deleted so that the vehicle is not woken up during this DRx mode to receive lower priority files. This priority is specified in each file's FBS header. Finally, where a file broadcast trigger occurs (such as shown in FIG. 2), the SR receiver 30 is tuned to the proper digital satellite transmission channel in advance of the scheduled file receipt time and the file is then received and stored or, if not successfully received, then the trigger is either left in place or reset and the process exits.

Figure 7:
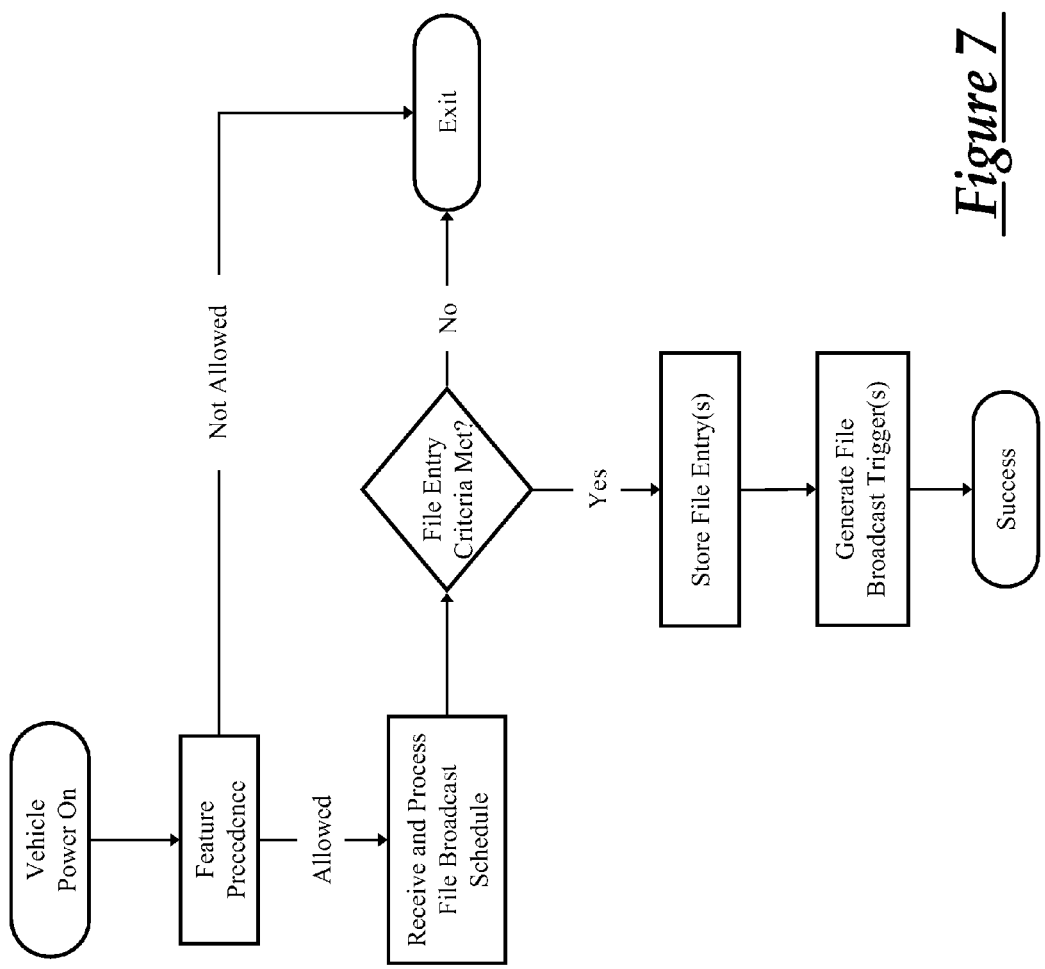
FIG. 7 is a flow chart of the FBS processing carried out by the file management application.

Turning now to FIG. 7, additional detail concerning processing of the FBS is shown. Where the vehicle power is on, a check is first made to determine if there is any feature precedence for which other processes have greater precedence over the FBS processing. If so, the process exits. If there is no overarching feature precedence, then the FBS file is received and parsed as described above. A check is then made to determine if the criteria is met for subsequently extracting a specific file from the broadcast stream. In particular, the process will store a file header entry for an expected specific file and generate a file broadcast trigger to receive the file at the appropriate time if the following conditions are all met:

1. the STID falls within the STID range identified in the file header;
2. the file has not already been received and stored (based on the File ID);
3. the Expiration date has not been reached; and
4. there is sufficient space in the staging area of the file system storage 40.

If any of these conditions are not met, the process ends without storing the file header entry or setting a trigger, and the file will therefore not be extracted from the received broadcast stream. If, however, all four criteria are met, the file header entry is stored and the file broadcast trigger is generated.

Figure 8:
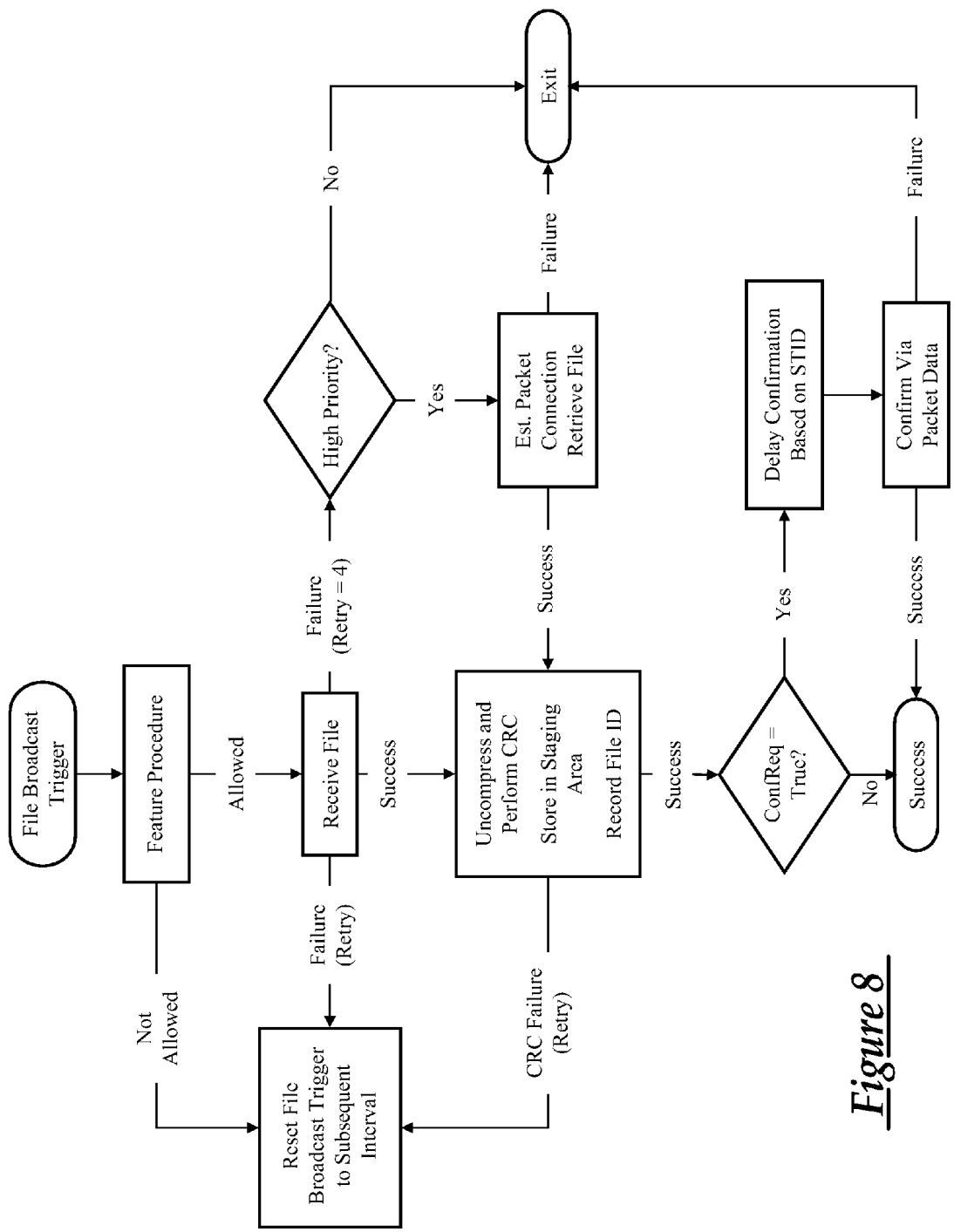
FIG. 8 is a flow chart of the process for handling file broadcast triggers and the actual receipt and storage of files from the satellite broadcast stream.

The process for receipt and storage of a specific file following occurrence of a broadcast trigger is shown in FIG. 8. First, feature precedence is checked to determine if processing of the trigger is permitted at this time. If not allowed, the first broadcast trigger is reset to occur during a subsequent broadcast interval and the process ends. If trigger processing is allowed, then the FMA 38 attempts to receive the file in the manner discussed above. If receipt fails, then the file broadcast trigger is reset to a subsequent broadcast interval unless receipt failure has occurred four times in which case further processing depends on the priority level for the file. If high priority, then the FMA 38 establishes a data packet connection with the central facility 12 via cellular network 20 to retrieve the file. If not high priority, then the process gives up attempting receipt of this file and the process exits. If the file is successfully received, either via the satellite broadcast or via the cellular call, then it is uncompressed if necessary, the CRC is checked to verify that it was received error-free, and the file is then stored in the staging area and the File ID recorded in the file system storage 40. If the Conf Req flag is TRUE, then the successful receipt is acknowledged via a call to the central facility over the cellular network 20. This confirmation can be delayed based on the STID so that all vehicles do not attempt to call and confirm receipt at the same time. For example, the delay can be determined based on the difference between the vehicle's STID and the start of the range specified in the file header.

Most of the vehicle file receipt processing discussed above has been considered during times of vehicle availability, such as when the vehicle ignition is on. FIG. 9 depicts a graph of the vehicle telematics unit current draw versus time showing the vehicle initially in its powered on state and then in several ignition off states. These ignition off states represent different low power quiescent (sleep) states that the telematics unit enters following the vehicle ignition being turned off. For the first 48 hours post-ignition on, the telematics unit is in a standby state in which the SR receiver 30 can be powered up by the wakeup signal with normal FBS and file receipt and processing then occurring. This is shown in broken lines at 70 where the current draw increases for a short time as a result of a file broadcast trigger and the associated SR receiver 30 being woken up and run to receive and pass through the data from the digital satellite broadcast stream. After the 48 hours of standby, the vehicle then enters the cyclic data receive (DRx) mode mentioned above in connection with FIG. 6. In this mode, the telematics unit enters a lower power mode in which it is not available for receipt of cellular calls or most other communications. In this mode, it utilizes a watchdog timer arrangement in which it receives a wakeup every ten minutes at which point it powers up to the standby state and maintains that state for one minute before returning to the lower power sleep mode. This one minute wakeup duration allows it to receive calls and carry out other needed processing if any such servicing is needed.

Where a file broadcast trigger occurs during this one minute wakeup duration, the SR receiver 30 will be powered up and the specified file(s) received and stored, with the wakeup duration being extended as necessary to complete this process. An example of this is shown at 72. Where instead the file broadcast trigger occurs in between DRx wakeups, processing is still possible, however, the telematics unit will need to be powered up before the SR receiver 30. This is shown at 74. Again, the wakeup at this point will be extended as necessary to complete the file download and storage. After a total period of five days post-ignition on, the telematics unit is dropped to its lowest quiescent power state to conserve battery power and no file receipt is then possible until the ignition is again switched on.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, although the illustrated embodiment has been described as it would be used in conjunction with vehicles, the disclosed system and file distribution and installation approach can be used with other types of remote receiving units, for example, hand-held units or fixed location units that are widely distributed or remotely located. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of distributing files to mobile vehicles that are configured for wireless communication with a central facility, comprising the steps of:
    sending to one or more vehicles a file broadcast schedule that identifies a plurality of files and that includes scheduling information indicating when the files will be transmitted, wherein at least some of the files contain software;
    analyzing the file broadcast schedule at one or more of the vehicles by identifying at least one specific file that contains software and that is intended for receipt and storage at that vehicle and by determining from the scheduling information a scheduled time at which the specific file is intended to be received;
    monitoring a digital satellite transmission channel at the scheduled time for the specific file;
    upon receiving the specific file, storing it in the vehicle such that it is available for installation in the vehicle;
    wherein the file broadcast schedule includes a header and a plurality of individual file entries, and wherein each file entry includes:
    (a) a station identifier that identifies one or more of the vehicles;
    (b) the scheduled time at which the specific file will be broadcast;
    (c) a file identifier that uniquely identifies the specific file; and
    (d) an expiration;
    wherein the vehicles are configured to use the station identifier in determining whether they are to store the specific file and, for those vehicles identified by the station identifier, the vehicle attempts to receive the specific file beginning at the scheduled time and for a period of time thereafter that is determined using the expiration.

2. The method of claim 1, wherein each file entry further includes a wakeup time and wherein, for the one or more vehicles identified by the station identifier, the method further includes the step of switching from a sleep mode to an active mode at the wakeup time and thereafter remaining in the active mode until the scheduled time.

3. A method of distributing files to mobile vehicles each of which can be identified using a station ID and each of which are configured for two-way wireless communication with a central facility, comprising the steps of:
    (a) creating a plurality of files and transmitting the files to a satellite broadcasting facility;
    (b) creating a file broadcast schedule that:
        (b1) identifies each of the files;
        (b2) identifies a plurality of selected vehicles using a station identifier that corresponds to one or more station IDs; and
        (b3) includes scheduling information indicating when the files will be transmitted;
    (c) sending the file broadcast schedule to the vehicles via wireless transmission;
    (d) analyzing the file broadcast schedule at each selected vehicle using a process that includes the steps of:
        (d1) identifying at least one specific file intended for receipt and storage at that vehicle by comparison of the station identifier and station ID;
        (d2) determining from the scheduling information a scheduled time at which the specific file is intended to be received;
    (e) transmitting the plurality of files via satellite transmission over a digital satellite transmission channel;
    (f) monitoring the digital satellite transmission channel at the scheduled time for the specific file;
    (g) receiving the specific file from the satellite transmission;
    (h) storing the specific file in the vehicle; and
    (i) sending an acknowledgement message from the vehicle to the central facility via a packetized data transmission.

4. The method of claim 3, wherein steps (c) and (e) together comprise sending the file broadcast schedule and plurality of files as a single data stream over the digital satellite transmission channel.

5. The method of claim 3, wherein step (i) further comprises sending the acknowledgement message via a wireless cellular communications network.

* * * * *